Feb. 9, 1965   G. M. L. SOMMERMAN ETAL   3,169,084
DEFERRED ACTION BATTERY
Filed Aug. 12, 1947   3 Sheets-Sheet 1
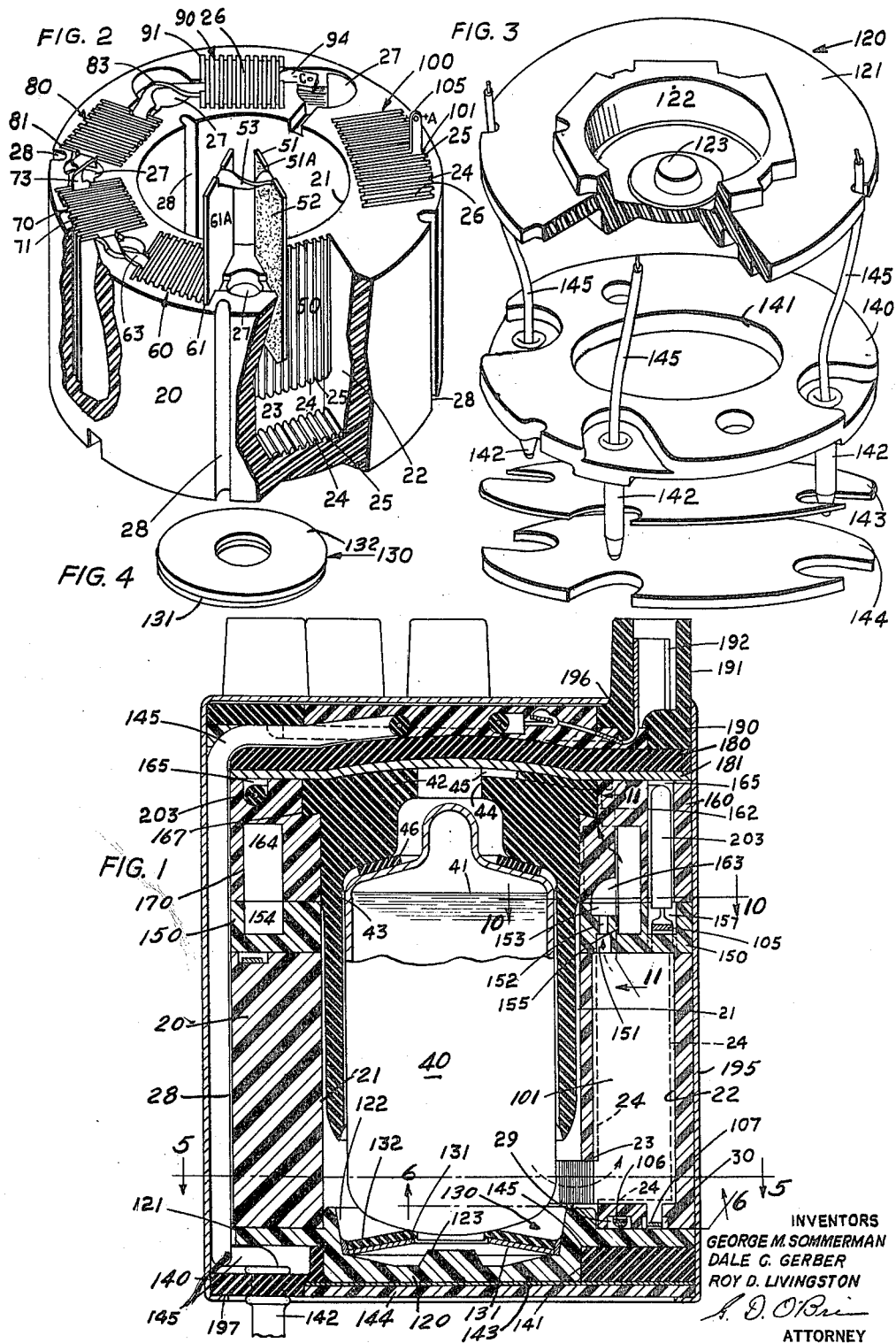
INVENTORS
GEORGE M. SOMMERMAN
DALE C. GERBER
ROY D. LIVINGSTON
ATTORNEY Feb. 9, 1965   G. M. L. SOMMERMAN ETAL   3,169,084
DEFERRED ACTION BATTERY
Filed Aug. 12, 1947   3 Sheets-Sheet 2
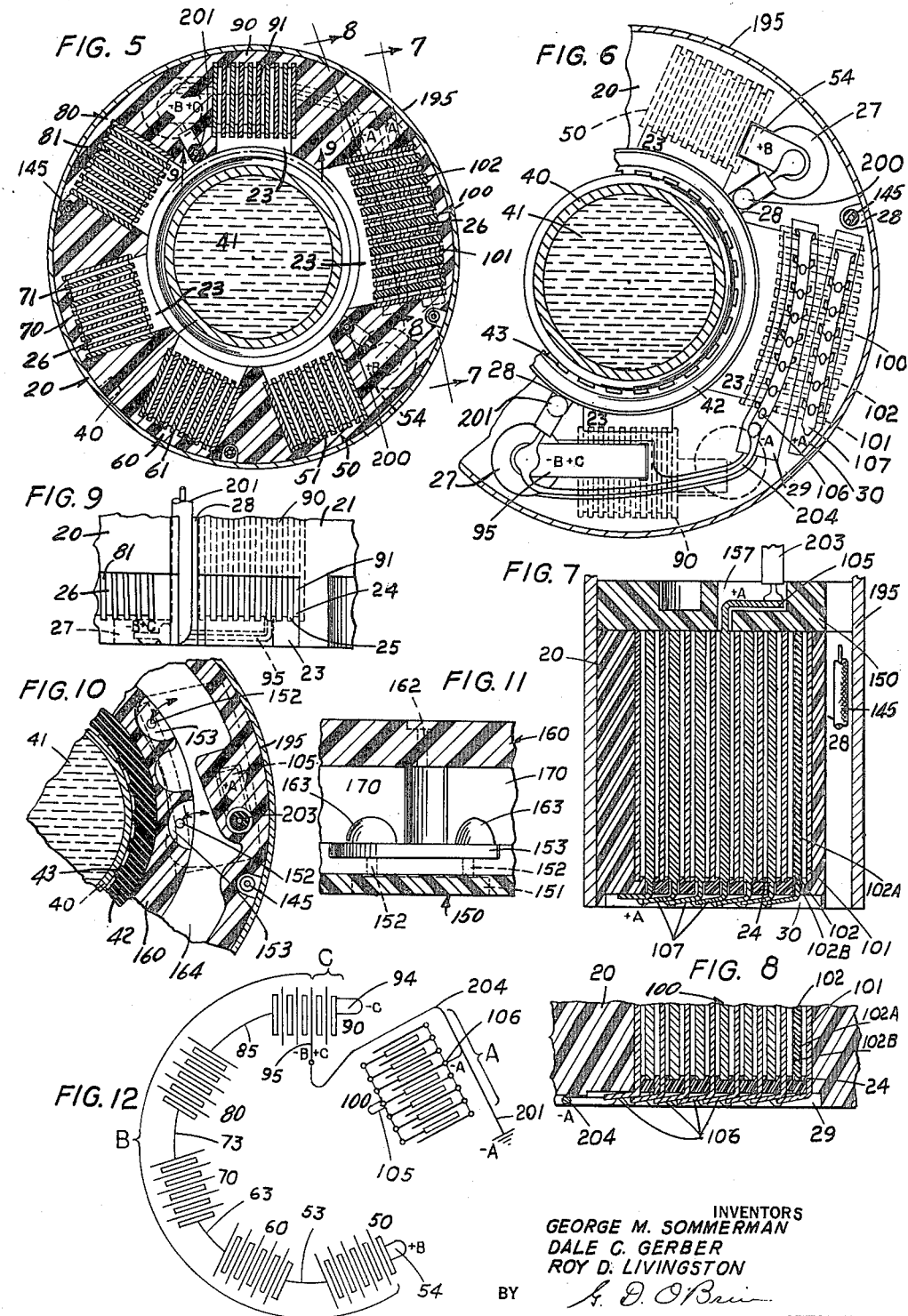
INVENTORS
GEORGE M. SOMMERMAN
DALE C. GERBER
ROY D. LIVINGSTON
BY
ATTORNEY Feb. 9, 1965   G. M. L. SOMMERMAN ETAL   3,169,084
DEFERRED ACTION BATTERY
Filed Aug. 12, 1947                                      3 Sheets-Sheet 3
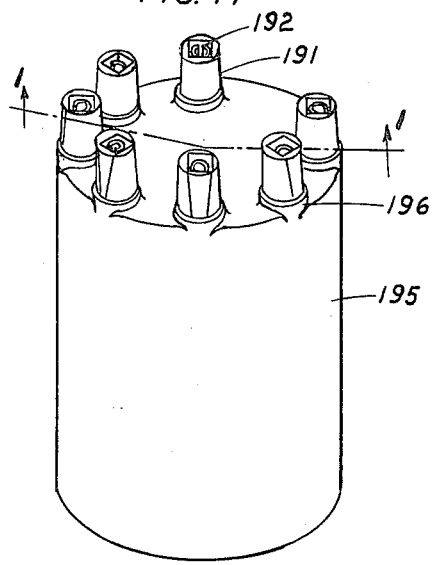
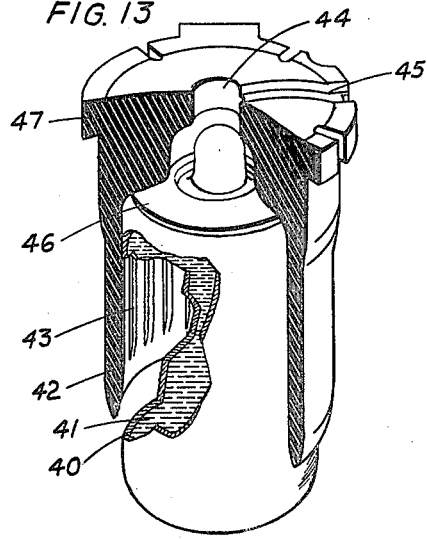
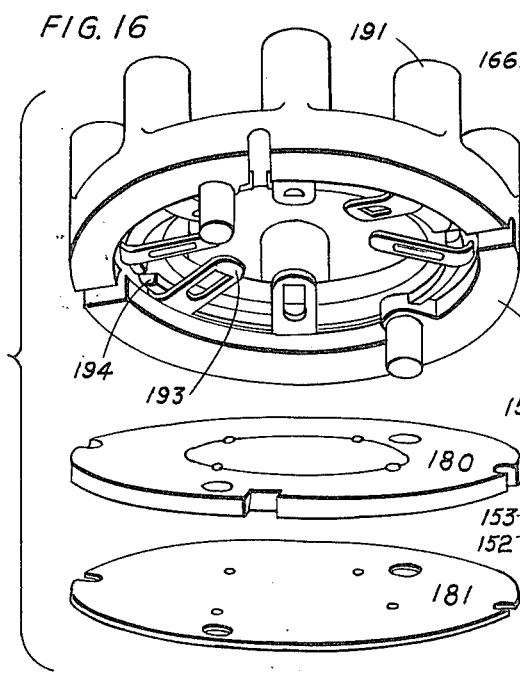
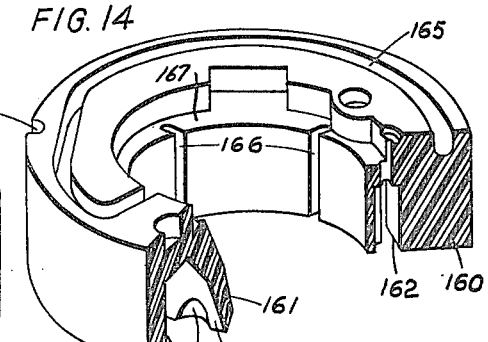
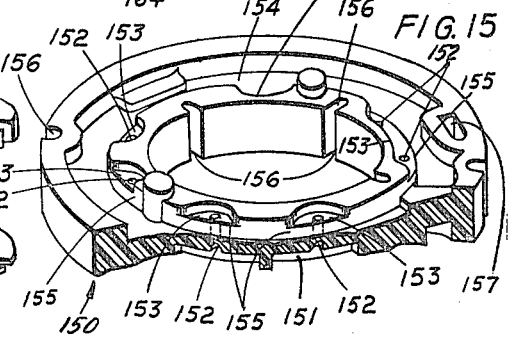
INVENTORS
GEORGE M. SOMMERMAN
DALE C. GERBER
ROY D. LIVINGSTON
BY
ATTORNEY

United States Patent Office 3,169,084
Patented Feb. 9, 1965

3,169,084
DEFERRED ACTION BATTERY
George M. L. Sommerman, Evanston, Ill., and Dale C. Gerber and Roy D. Livingston, North Canton, Ohio, assignors to the United States of America as represented by the Secretary of the Navy
Filed Aug. 12, 1947, Ser. No. 768,194
11 Claims. (Cl. 136—90)

This invention relates to deferred action type, primary batteries.

One of the principal uses for batteries of this type is to provide a source of electrical energy for use in electrically detonated projectiles. Among the principal requirements for batteries used in this manner are compactness, positive and reliable operation under adverse conditions of use, long shelf life, and the ability to generate both a high and low voltage output. When fired from a gun, a projectile and its components are subjected to a force of setback, and if the bore of the gun is rifled, the projectile and its components are also subjected to centrifugal force caused by spinning of the projectile about its longitudinal axis during its passage through the gun and in flight. Thus, batteries of this type must no only be capable of withstanding shock occasioned by ordinary handling of projectiles, but also they must be sufficiently rugged to remain operable during and after being subjected to centrifugal force and the force of setback. Furthermore, batteries of this type for use in projectiles must be constructed to occupy a minimum volume of space inasmuch as the maximum available volume of the projectile must be dedicated to containing explosives. The requirement for long shelf life, under adverse conditions of use, is essential because projectiles are shipped to and stored in all parts of the world, where conditions of temperature and moisture are widely varied.

An object of the present invention is to provide a deferred action type, primary battery having characteristics which will make the battery operable when it is subjected to the service conditions described above.

Another object of the invention is to provide a deferred action type, primary battery which will remain in an unactivated, inoperative condition when not in use, and which will become activated in a predetermined time when subjected to centrifugal force and/or the force of setback to supply a predetermined amount of voltage and current.

Still another object of the invention is to provide a deferred action type, primary battery which will not be adversely affected in an unactivated condition or in an activated condition by either extremely high or low temperature and moisture conditions or by sudden changes in temperature and moisture conditions.

A further object of the invention is to provide a deferred action type, primary battery which will be extremely compact in construction, positive in operation, and yet be capable of generating predetermined amounts of voltage and current.

A still further object of the invention is to provide a deferred action type, primary battery, having the electrolyte normally separated from the electrodes, which, when the electrolyte is released, will uniformly distribute the electrolyte throughout the spaces between the faces of the electrodes, but which will not permit the edges of the electrodes to become flooded by excess electrolyte.

Still another object of the invention is to provide a deferred action type, primary battery of the character described which will operate with a minimum of electrical leakage and a minimum of electrical noise.

Still another object of the invention is to provide a battery of the character described which will be capable of being manufactured in large quantities at relatively low cost.

These and other objects of the invention will be better understood by reference to a preferred embodiment of the present invention as shown in the following description and accompanying drawings, in which FIG. 1 is a central, vertical, sectional view substantially on the line 1—1 of FIG. 17;

FIG. 2 is a fractional, perspective view of the dielectric, electrode housing showing one pair of the cooperating electrodes of adjacent cell units partially removed;

FIG. 3 is an exploded, perspective view of the bottom housing cover, prong support, spacer and bottom plate;

FIG. 4 is a perspective view of the ampoule support;

FIG. 5 is a cross-sectional view looking down on the line 5—5 of FIG. 1;

FIG. 6 is a fractional, detailed, cross-sectional view looking up on the line 6—6 of FIG. 1;

FIG. 7 is a cross-sectional view on the line 7—7 of FIG. 5, showing the paralleling of one unit of elements of the "A" battery;

FIG. 8 is a cross-sectional view on the line 8—8 of FIG. 5, showing the paralleling of the other unit of elements of the "A" battery;

FIG. 9 is a detailed, sectional view taken on the line 9—9 of FIG. 5, showing one of the entrance ports to one of the cell units;

FIG. 10 is a cross-sectional view looking down on a portion of the overflow cup and housing cover taken on the line 10—10 of FIG. 1;

FIG. 11 is an enlarged, detailed, vertical, sectional view of a portion of the overflow passage of the top housing cover and overflow cup taken on the line 11—11 of FIG. 1;

FIG. 12 is a diagrammatic view of the electrical circuit arrangement of the battery;

FIG. 13 is a fractional, perspective view of the ampoule, rubber ampoule support and washer;

FIG. 14 is a fractional, perspective view of the top portion of the overflow cup;

FIG. 15 is a fractional, perspective view of the housing cover which cooperates with the overflow cup to form a storage chamber;

FIG. 16 is an exploded, perspective view of the turret, turret support and washer; and FIG. 17 is a perspective view of a completed battery assembly embodying the present invention.

Referring to FIGS. 1 and 2 of the drawings, there is shown a one-piece cylindrical electrode housing 20 made of dielectric material. In a preferred embodiment, the housing 20 is made of polystyrene and is formed by injection molding. The housing is provided with a central, longitudinal passage 21 which is adapted to receive the lower portion of the ampoule 40 and its outer resilient sleeve or support 42. The body of the housing 20 is provided with a plurality of longitudinal, radially disposed recesses 22 which are adapted to retain the electrode cell units 50, 60, 70, 80, 90 and 100. The recesses 22 are provided with entrance ports 23 communicating with the passage 21 at the lower, internal portion of the housing 20. The inner and outer sides and the bottom of the recesses 22 are ribbed, as at 24, to provide spaced electrode grooves 25 which are adapted to position and space the electrode plates of the cell units. The housing 20 is provided at its upper surface between the recesses 22 with connector wells 27 which are fashioned to house the electrode connectors and thereby conserve the space required for the complete battery assembly. The inner and outer surfaces of the housing 20 are provided with inner, longitudinal wire grooves 28 which serve to house the electrical wires leading to the terminals of the battery and with outer, longitudinal wire grooves 28 which house the electrical wires leading from the terminals 192 to the prongs 142, thereby reducing the space required by the complete battery assembly. As shown in FIG. 6, the bottom of the housing is also provided with the connector wells 27 and with two parallel tab channels 29 and 30 for housing the —A electrode tabs 106 and the +A tabs 107 respectively of the cell units 100.

Referring now to FIG. 2, wherein the adjacent, end electrodes of the units 50 and 60 are partially removed and the remainder of the electrodes of the units 50 are completely removed for purposes of clarity in the view, the electrode cell units are housed longitudinally and radially in the recesses 22 with the electrode plates 51, 61, 71, 81, 91 and 101 held in the grooves 25, the spaces 26 between the plates being defined by the width of rib 24.

The cell units, 50, 60, 70, 80 and 90 are of light construction and will be described with reference to the unit 50 which comprises a number of electrode plates 51 of zinc. The exposed face 51A acts as the cathode and the other face is coated with lead peroxide ($PbO_2$) 52 which acts as the anode. The electrodes are so arranged that the lead peroxide anode face 52 is cooperating with and adjacent to the exposed, zinc cathode face 51A of the adjacent plate. The electrodes are separated by the spaces 26 which are normally empty, being filled with electrolyte 41 during activation of the units. The particular construction of the cell units 50, 60, 70, 80 and 90 is also shown in FIG. 9 with reference to the unit 90. While the described construction is preferred it will be understood that the cooperating electrodes may be constituted of plates of dissimilar metals or the plates may be coated with dissimilar metals.

Referring now to FIGS. 7 and 8, the electrodes of the cell unit 100 comprise a cathode plate 101 of zinc which has both faces exposed and a cooperating zinc anode plate 102 which has both faces coated with lead peroxide, as shown at 102A and 102B and therefore functions as an anode plate. The cooperating electrode plates 101 and 102 are arranged in face to face relationship in alternate order.

The preferred method of coating the sides of the zinc electrode plates with lead peroxide comprises initially coating the zinc plate with lead. This may be accomplished by spraying the lead, as by molecular deposition, or the lead may be rolled on by the application of heat and pressure, or the lead may be applied by electrolytic plating. The lead coating is then converted to lead peroxide by anodizing. In a preferred method, anodizing is accomplished by immersing the lead coated zinc plate in a bath containing a solution of magnesium sulfate ($MgSO_4$) and a suitable nitrate. Current is caused to flow through the bath and the plate which converts the lead to lead peroxide. However, it has been found that the lead peroxide contains some lead nitrate ($PbNO_3$) impurity. This impurity is eliminated by deanodizing the plate in the same solution which separates out the lead nitrate as it unplates the lead dioxide from the zinc plate. The lead peroxide is then reapplied by reanodizing in the same solution.

Referring to FIG. 2, cell units 50, 60, 70 and 80 and the adjacent portion of the cell unit 90 are electrically connected in series to provide B voltage by means of the intermediate electrode connectors 53, 63, 73 and 83 housed in the connector wells 27 between the adjacent, inner end plates of the units 50, 60, 70, 80 and 90. These units are connected to current consuming means (not shown) by the bottom, end +B electrode connector 54, shown in FIG. 6 and by the bottom, center —B+C electrode connector 95 of the unit 90, as shown in FIG. 6 and 9. The +B electrode connector 54, shown in FIG. 6 on the bottom of the end plates of the cell unit 50, is housed in the connector well 27 between the units 50 and 100 and is electrically connected to one of the conducting metal terminals 192 shown in FIGS. 1 and 17 by means of the wire 200 mounted in the inner, wire groove 28. The central —B+C electrode connector 95 is electrically connected to one of the terminals 192 by means of the wire 201 mounted in the other inner, wire groove 28.

Referring to FIGS. 5, 6 and 9, it will be seen that the cell unit 90 is electrically connected in series for providing B voltage at the portion adjacent the unit 80; whereas the portion adjacent the unit 100 is electrically connected in series to provide C voltage. By means of this arrangement, the bottom center electrode connector 95 carries —B+C voltage to the wire 201 which is relayed to one of the terminals 192. As shown in FIG. 6, the wire 204 is electrically connected to the unit 100 at the —A terminal electrode tab 106. The top, end —C electrode connector 94, shown in FIG. 2, is housed in the connector well 27 between the units 90 and 100 and is electrically connected to one of the terminals 192 by means of a wire (not shown).

Referring to FIGS. 7 and 8, the cathode electrode plate 101 and the anode electrode plate 102 of the unit 100 are connected in parallel to provide A voltage by means of the —A anode tabs 106 and the +A cathode tabs 107 which are contacted in parallel and housed respectively in tab channels 29 and 30 in the bottom of the housing 20. As shown in FIG. 8, the —A anode tabs 106 are electrically connected by means of the wire 204 to the —B+C connector 95 which leads to one of the terminals 192. In the particular embodiment of the invention described, the —A connector and the —B+C connector are electrically grounded through the wire 201 and one of the terminals 192 to the body of a projectile (not shown). The +A electrode tabs 107 are electrically connected in parallel as shown in FIG. 7 and the current is drained through the +A central electrode connector 105 shown in FIGS. 2 and 7 which is housed in the connector channel 157 in the intermediate overflow housing cover 150. The +A electrode connector 105 is electrically connected to one of the terminals 192 by means of the wire 203 which is housed in the wire channel 165 in the top overflow cap 160 as shown in FIGS. 1 and 14.

Referring now to FIG. 12, the electrical circuit arrangement is such that the units 50, 60, 70, 80 and the adjacent portion of the unit 90 are connected in series to provide B voltage with the +B end electrode connector 54 connected to one of the terminals 192 shown in FIG. 17. The —B+C central electrode connector 95 of the unit 90 is connected to the —A anode tab 106 by means of the wire 204 as shown in FIGS. 6 and 8. The portion of the unit 90 adjacent to the unit 100 is electrically connected in series to provide C voltage with the —C end electrode connector 94 connected to one of the terminals 192 by means of a wire (not shown). The unit 100 is electrically connected in parallel to provide A voltage with the —A tab 106 connected to the wire 201 leading to one of the terminals 192 which is grounded to the body of the projectile (not shown). The +A connector 105 is electrically connected to one of the terminals 192 by means of the wire 203 as shown in FIGS. 7 and 10.

Referring now to the electrolyte containing means, there is shown in FIGS. 1 and 13 a frangible, sealed ampoule 40 containing an electrolyte 41 and positioned in the longitudinal central passage 21 of the battery assembly. A resilient sleeve or support 42 is adapted to be mounted over the top of the ampoule 40 to position it in the passage 21 and to protect it from accidental breakage. The support 42, which is preferably formed of soft rubber, is provided with longitudinal ribs 43 on the inner surface and a center hole 44 at the top thereof, communicating with a top surface channel 45 and a flange 47 for positioning the support 42 in the inner annular rim 167 of the top housing cover 160 as shown in FIG. 14. A soft rubber washer 46 is interposed between the top of the ampoule and the support 42 in order to prevent the ampoule from adhering to the support when the ampoule is acted upon by the force of setback tending to move it downwardly against the breaker mechanism now to be described.

Referring now to FIGS. 1, 3 and 4 for details of the breaker mechanism, the housing 20 is supported and closed at its base by a dielectric breaker plate 120 provided with an annular ledge 121 surrounding a central well 122 having a striker 123 projecting upwardly from the center of the well. Positioned in the well 122 is an ampoule support 130, shown in FIG. 4 which comprises an open-center, reversible, concavo-convex resilient metal disc 131 commonly known as a Belleville washer. A rubber washer 132 is bonded to the convex surface of the disc 131 in order to cushion and absorb accidental shock imparted to the ampoule 40 during handling and shipping of the battery assembly. Although other types of breaker mechanisms may be employed, it is preferred to utilize those types disclosed in copending applications Ser. No. 502,069, filed September 11, 1943, and Ser. No. 541,955, filed June 24, 1944. It should be further understood that breaker mechanisms which are actuated by either centrifugal force or the force of setback or both may be used.

The breaker plate 120 rests upon an annular prong support 140 made of a hard, dielectric material such as phenolic resin. The prong support 140 has a center hole 141 which is adapted to receive the bottom of the well 122 of the breaker plate 120. Electrical connectors or prongs 142 are mounted in the prong support 140 and are electrically connected to the wires 145 mounted in the outer wire grooves 28. The terminals 192 connected to the prongs 142 are connected to current consuming means in the projectile (not shown). The prongs 142 are also connected to components of the projectile (not shown).

Referring now to the means for exhausting and storing excess electrolyte not maintained in the spaces 26 between the electrode plates, reference may be had to FIGS. 1, 10, 11, 14 and 15.

In order to close the top of the housing 20 there is provided an annular, intermediate, overflow housing cover 150 shown in detail in FIG. 15 and a cooperating top overflow cap 160 shown in detail in FIG. 14. The cover 150 and the cap 160 are provided with annular chambers 154 and 164 respectively which chambers cooperate to define an annular overflow chamber 170, shown in FIG. 1, for receiving excess electrolyte from the cell units. As shown in detail in FIGS. 10 and 11, the bottom portion of the overflow housing cover 150 is provided with a plurality of overflow slots 151 which communicate with the spaces 26 between the electrodes and the overflow ports 152 which serve as exhaust passages for the excess electrolyte. Overflow cutouts 153 are provided at the top of the overflow ports 152 in the inner rim or overflow dam 155 of the housing cover 150. The inner annular flange 161 of the overflow cap 160 is provided with overflow hoods 163 aligned directly above the overflow ports 152 and cooperating with the overflow cutouts to direct the flow of electrolyte across the dam 155 and into the overflow chamber 170. A gas exhaust port 162 in the top of the overflow cap 160 communicates with the channel 45 and the center hole 44 in the ampoule support 42, shown in FIG. 13, to permit excess air and gas in the overflow chamber 170 to be exhausted as the chamber receives excess electrolyte from the overflow ports 152. The inner and outer longitudinal wire grooves 156 and 166 of the housing cover 150 and the overflow cap 160 are aligned with the inner and outer wire grooves 28 for housing the inner wires 200, 201, 203, 204 and the outer wires 145. The inner annular rim 167 is adapted to receive the flange 47 of the ampoule support 42.

Referring to FIGS. 1 and 16, a closure disc 180 of hard plastic material such as the synthetic resin now being sold under the trademark "Bakelite" is mounted on the overflow cap 160 and separated therefrom by a seal washer 181. A turret support 190 is mounted on the closure disc 180. The turret support 190, which is composed of a hard plastic material such as the synthetic resin now being sold under the trademark "Bakelite," is provided with a plurality of terminal housings 191 containing metal terminals 192 electrically connected to the conducting lugs 193 by means of the conducting bands 194. One of the conducting lugs 193 is coupled to the +B wire 200 which carries the B current generated by the battery. Another conducting lug 193 is coupled to the −B+C wire 201 which grounds the −A current. Another conducting lug is coupled to the +A wire 203 which carries the A current and another lug is coupled to a wire (not shown) which carries the −C current. The remainder of the lugs are connected by the outer wires 145 to the prongs 142 located at the base of the battery.

Referring now to FIGS. 1 and 17, the components of the battery assembly are mounted in a case 195, preferably made of zinc metal, which is provided with a plurality of holes 196 through which the terminals 191 project and the bottom edge is crimped, as at 197, over the edge of the bottom plate 144.

It will be apparent that the breaker plate 120 along with its spacer 143 and the closure disc 180 along with its seal washer 181 function as closure members to seal the bottom of the housing 20 and the top of the overflow cap 160, respectively, from leakage of electrolyte.

With reference to the assembly of the various components of the battery, the method of assembling the electrode plates into the grooves 25 of the housing 20 is of particular importance for the reason that the edges of the electrode plates must be maintained out of contact with the electrolyte to prevent short-circuiting from one side of the coated plate to the other. In order to obtain a satisfactory seal of the electrode plates in the grooves 25, a small amount of solvent for the dielectric housing material is placed in the bottom of the housing 20 after the electrodes and the breaker plate 120 have been assembled to the housing. The assembly is then spun to work the solvent up along the edges and soften up the ribs 24 between the plates. Additional spinning then forces the softened ribs out against the electrode plates thereby resulting in a liquid-tight seal. In the particular embodiment shown, the housing 20 is made of polystyrene and the solvent used is toluene. In practice it has been found satisfactory to spin the assembly initially at about 1000 r.p.m. for about 25 seconds and subsequently spin the assembly at about 5000 r.p.m. for about 25 seconds.

In assembling the dielectric components of the battery, it has been found preferable to paint and thereby soften the contacting surfaces of the dielectric components with a suitable solvent. In practice it has been found satisfactory to use polystyrene as the dielectric material for the housing 20, the breaker plate 120, and for the members 150 and 160 which cooperate to form the overflow exhaust and storage means. A suitable cement such as ethyl methacrylate is then applied to the contacting surfaces and they are pressed into intimate contact by the application of about 350 lbs. pressure for about 10 minutes. In this manner a liquid-tight seal may be obtained which will prevent the leakage of electrolyte from the battery assembly caused by pressure resulting from centrifugal force and the force of setback acting on the electrolyte.

Other components of the battery assembly, such as the metal terminals 192 and the metal prongs 142 are assembled by press fitting and bonding, as by soldering, in the conventional manner. The bottom closure plate 144 is secured in place by the crimped edge 197 of the metal casing 195.

Although the battery of the present invention is not limited to the use of a particular electrolyte, a preferred electrolyte solution which has been found to be particularly effective is one containing by volume 1 part hydrochloric acid (HCl), 8 parts ortho-phosphoric acid ($H_3PO_4$), 8 parts water and about 1.5% by weight mercuric chloride ($HgCl_2$). Electroytes of this type are disclosed in copending applications Ser. No. 503,157, filed on September 20, 1943.

The operation of the battery of the present invention will be described with reference to its use in an electrically detonated projectile with the prongs of a current consuming device (not shown) engaged with the terminals 192 and the prongs 142 engaged with other components of the projectile such as detonating means (not shown). Referring to FIG. 1, when a projectile containing a battery of the present invention is fired from a rified gun, the force of setback shifts the ampoule 40 downwardly against the ampoule support 130 and depresses it sufficiently to cause the ampoule to contact the striker 123 thereby shattering the frangible ampoule which releases the electrolyte 41.

The force of setback causes the electrolyte to be dispersed in the direction of the breaker plate 120 and thence outwardly through the entrance ports 23 into the spaces 26 between the electrode plates. In addition, centrifugal force caused by spinning of the projectile also causes the electrolyte to be forced through the entrance ports 23 and into the spaces 26 between the electrode plates. Upon being contacted by the electrolyte, the cells become activated and generate electrical current which is conducted to the terminals 192 by means of the electrical wires connected to the electrode connectors. The size of the entrance ports 23 may be varied to control the volume and rate of flow of electrolyte. Inasmuch as each multicell unit is provided with an entrance port 23, instantaneous, simultaneous activation is assured. This feature is essential for batteries used in electrically detonated projectiles. In this connection, batteries made in accordance with the present invention have become activated in .05 second when subjected to no more than 200 revolutions per second.

Excess electrolyte, that is, electrolyte which is not accommodated by the spaces 26 between the electrodes is collected by the overflow slots 151 and exhausted by means of the overflow ports 152 as shown in FIG. 1. The electrolyte spills into the overflow cutouts 153, against the overflow hoods 163 and flows across the dam or ledge 155 into the overflow storage chamber 170. The exhausting of excess electrolyte is an important feature of the invention inasmuch as it eliminates flooding of the cells which causes short circuiting (electrical leakage) at the edges of the coated electrodes. Another important feature is the continual, uniform flow of electolyte throughout the spaces 26 between the electrodes which assures uniform activation of the cell units for the reason that air pockets between the electrodes are eliminated and a supply of fresh electrolyte is maintained.

Inasmuch as the overflow chamber 170 is electrically insulated from the electrodes and is not grounded, no voltage noise or variation in voltage will be caused by instantaneous electrolyte overflow from any of the cell units. Furthermore, voltage noise is held to a minimum by the overflow dam 155 which functions to break the path of the overflowing liquid. This elimination or reduction of voltage is of prime importance for batteries employed in providing electrical energy to current consuming means including components which are sensitive to variations in electrical signals.

One of the principal objections to electrical noise is that it causes a temporary decrease in voltage output. It is believed that the main causes of electrical noise in batteries of the present type are (1) a leakage path of electrolyte from a + electrode to the ground; (2) flow of electrolyte around the edges of the coated electrodes which act as both anode and cathode for adjacent cells, and (3) electrical leakage from the +B cell unit to the A cell unit. It will be seen that the battery of the present invention makes provision for eliminating these three main causes of electrical noise.

Referring again to the overflow chamber 170, air and gas in the chamber are exhausted through the gas vent 162, through the channel 45 and the center hole 44 of the ampoule support 42 into the central passage 21 which is normally filled by the ampoule 40.

For use in an electrically detonated projectile, the battery of the present invention must be capable of providing predetermined values of current and voltage and it must be constructed to meet predetermined compact dimensions. The electrical requirements are such that the B voltage should be sufficient to energize the anode plates of a plurality of vacuum tubes; that is, a relatively high voltage on the order of 90 volts and a relatively low current on the order of 10 milliamperes. The A voltage should be sufficient to heat the filaments of a plurality of vacuum tubes; that is, a low voltage on the order of 1.4 volts and a high current on the order of 400 milliamperes. The C voltage should be sufficient to provide a bias for the grid of a "Thyratron" tube; that is, a medium voltage on the order of 6.9 volts and no appreciable current. Batteries made in accordance with the present invention and capable of providing the above-mentioned electrical output have been constructed with overall dimensions of 2.5 inches in length and a diameter of 1.5 inches, the length of the cylindrical body portion being 1 11/16 inches and the length of the electrode housing being 1 inch. These specific dimensions are set forth in order to disclose the extreme compactness which is required for batteries of this type. However, it should be realized that for batteries used in electrically detonated projectiles, it is not necessary that they remain activated over a long period of time because of the short life of a projectile after it has been fired from a gun.

We claim:

1. In a deferred action type battery including a dielectric housing, a plurality of cooperating electrodes mounted in said housing in face to face relation and separated to provide spaces for electrolyte therebetween, a supply of normally confined electrolyte normally separated from said electrodes and means for releasing said electrolyte, a plurality of entrance ports communicating between the supply of electrolyte and the spaces between the electrodes, means for discharging out of contact with the electrodes electrolyte which is in excess of that required to fill the spaces between the electrodes, an oveflow chamber in the housing for storing said excess electrolyte in communication with said discharging means to prevent flooding and consequent short-circuiting of the electrodes, said entrance ports being disposed at an end of the electrodes remote from the discharging means whereby to permit passage of the electrolyte throughout the area of the spaces between the electrodes.

2. In a deferred action type primary battery including a dielectric housing, a plurality of cooperating electrodes mounted in said housing in face to face relation and separated to provide spaces for electrolyte therebetween, a supply of electrolyte normally separated from said electrodes and means for releasing said electrolyte, means for distributing the electrolyte into the spaces between the electrodes, means for discharging out of contact with the electrodes electrolyte which is in excess of that required to fill the spaces between the electrodes, and an overflow chamber communicating with said discharging means, said overflow chamber having a flange mounted therein adjacent the discharging means for diffusing the electrolyte throughout the overflow chamber whereby to prevent flooding and consequent short-circuiting of the electrodes.

3. A deferred action type primary battery comprising a dielectric housing provided with an axial passage, a plurality of cooperating electrodes radially mounted in said housing in face to face relation and separated to provide spaces for electrolyte therebetween, a supply of electrolyte disposed in said axial passage and normally separated from said electrodes, means for releasing the electrolyte for contact with the electrodes, at least one entrance port disposed in said housing and communicating between the said passage and one end of said electrodes for distributing the released electrolyte into the spaces between the electrodes, at least one discharge port disposed at the opposite end of the electrodes for discharging excess electrolyte not maintained in the spaces between the electrodes, and a storage chamber communicating with said discharge port for receiving and storing the excess electrolyte.

4. A deferred action type primary battery comprising a dielectric cylindrical housing provided with an axial passage, a plurality of longitudinal recesses in said housing, a supply of normally confined electrolyte disposed in said passage, a plurality of cooperating electrode cell units radially mounted in said recesses in face to face relation and separated to provide spaces for electrolyte between the faces, means positioned at one end of said passage for releasing the confined electrolyte into the passage, a plurality of entrance ports provided in said housing at one end of said passage for distributing the released electrolyte from the passage directly into the spaces between the electrodes, a dielectric housing cover defining a storage chamber mounted on said housing at the other end of said passage, said housing cover including a plurality of discharge ports communicating between said recesses and the storage chamber for discharging excess electrolyte not maintained in the spaces between the electrodes whereby to prevent flooding and consequent short circuiting of the electrodes.

5. The deferred action type primary battery set forth in claim 4 wherein the dielectric housing cover comprises an intermediate section and an outer overflow cup defining an overflow chamber, said intermediate section having a plurality of discharge ports and an overflow flange disposed adjacent thereto for diffusing the electrolyte discharged through said discharge ports.

6. In a deferred action type primary battery, a dielectric cylindrical housing provided with an axial passage, a plurality of longitudinal, radial recesses in said housing, a frangible sealed ampoule containing electrolyte disposed in said passage, means positioned adjacent said passage for fracturing said ampoule upon the application of a predetermined force of set back to release the electrolyte, a plurality of cooperating electrode cell units housed in said recesses in face to face relation and separated to provide spaces between the faces for maintaining electrolyte, a plurality of entrance ports provided adjacent said passage at one end of said housing for transmitting electrolyte from said passage to the spaces between the electrodes, a dielectric housing cover mounted at the other end of said housing and defining a storage chamber for receiving excess electrolyte not maintained in the spaces between the electrodes, said cover having a plurality of discharge ports for discharging excess electrolyte from said spaces to said storage chamber, whereby to minimize flooding of the electrodes, and an overflow flange mounted in the overflow chamber adjacent the discharge ports for diffusing the electrolyte discharged through the discharge ports whereby to reduce short circuiting of the electrodes and consequent electro-chemical noise.

7. The deferred action type primary battery set forth in claim 3 wherein the cooperating electrodes comprise plurality of electrode cell units, one portion of said cell units being electrically connected in series for developing a relatively high voltage and another portion of said multi-cell units being electrically connected in parallel for developing a relatively low voltage.

8. The deferred action type primary battery set forth in claim 3 wherein the cooperating electrodes comprise plurality of electrode multi-cell units, one portion of said multi-cell units being electrically connected in series for developing a relatively high voltage, another portion of said multi-cell units being electrically connected in parallel for developing a relatively low voltage, and another of said multi-cell units being electrically connected in series for developing a medium voltage.

9. A deferred action type primary battery including a dielectric housing having an axial passage therein, a plurality of cooperating electrodes mounted in said housing in face to face relation and separated to provide space for electrolyte therebetween so as to form cell units, a supply of electrolyte disposed in said passage and normally separated from said electrodes, means for releasing the electrolyte for contact with the electrodes, a storage chamber in said housing for receiving and storing excess electrolyte, said storage chamber being electrically insulated from said electrodes and from the ground, and means between said storage chamber and said cell units for breaking the path of overflow of said electrolyte, whereby voltage noise or variation in voltage caused by instantaneous electrolyte overflow from any of said cell units is reduced to a minimum.

10. A deferred action type battery comprising a dielectric housing having an axially disposed passage therein a plurality of cooperating electrode cell units mounted in said housing in face to face relation and separated to provide space for electrolyte between the faces, a supply of normally confined electrolyte disposed in said passage, means in said passage for releasing the confined electrolyte into said cell units, a storage chamber in said housing, means for determining the depth of electrolyte in said cell units and passages for discharging excess electrolyte from said cell units into said storage chamber, said means including a dam for breaking the path of overflow of said electrolyte from said cell units.

11. In a deferred action type primary battery including a dielectric housing, a plurality of cooperating electrodes mounted in said housing in face to face relation and separated to provide spaces for electrolyte therebetween, a supply of electrolyte normally separated from said electrodes, means for releasing said electrolyte, means for distributing said electrolyte into the spaces between said electrodes, a plurality of overflow ports communicating with the spaces between said electrodes for discharging out of contact with said electrodes electrolyte which is in excess of that required to fill the spaces between said electrodes, and an overflow chamber for storing said excess electrolyte in communication with said overflow ports whereby to prevent flooding and consequent short-circuiting of said electrodes, said overflow ports being disposed at an end of said electrodes remote from the distributing means thereby to permit passage of said electrolyte throughout the area of the spaces between said electrodes.

References Cited by the Examiner

UNITED STATES PATENTS

| | | | |
|---|---|---|---|
| 2,403,567 | 7/46 | Wales. | |
| 2,502,723 | 4/50 | Harriss | 136—113 |
| 2,534,056 | 12/50 | Pitt | 136—90 |

JOHN H. MACK, *Primary Examiner.*

F. P. McDERMOTT, JAMES L. BREWRINK,
*Examiners.*